(12) United States Patent
da Silva et al.

(10) Patent No.: US 10,033,319 B2
(45) Date of Patent: Jul. 24, 2018

(54) METHOD FOR TUNING A MOTOR DRIVE USING FREQUENCY RESPONSE

(71) Applicant: Rockwell Automation Technologies, Inc., Mayfield Heights, OH (US)

(72) Inventors: Aderiano M. da Silva, Oak Creek, WI (US); Brian Fast, Kirtland, OH (US); Robert J. Miklosovic, Chardon, OH (US); Michelle E. Holt, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 68 days.

(21) Appl. No.: 14/842,495

(22) Filed: Sep. 1, 2015

(65) Prior Publication Data
US 2017/0063268 A1 Mar. 2, 2017

(51) Int. Cl.
G05B 11/01 (2006.01)
H02P 23/14 (2006.01)
G05B 13/02 (2006.01)
H02P 23/00 (2016.01)

(52) U.S. Cl.
CPC .............. *H02P 23/14* (2013.01); *G05B 13/02* (2013.01); *H02P 23/0004* (2013.01)

(58) Field of Classification Search
USPC ....................................................... 318/560
See application file for complete search history.

(56) References Cited

U.S. PATENT DOCUMENTS

| 6,219,196 B1 * | 4/2001 | Semba ................... G11B 5/596 318/560 |
| 7,141,946 B2 | 11/2006 | Rehm et al. |
| 7,345,443 B2 | 3/2008 | Yoshiura et al. |
| 2003/0040817 A1 | 2/2003 | Krah et al. |

(Continued)

FOREIGN PATENT DOCUMENTS

| EP | 2980986 A1 | 2/2016 |
| WO | 2007136828 A2 | 11/2007 |

OTHER PUBLICATIONS

Yaskawa, AC Servo Drives £-V Series User's Manual, Manual No. SIEP S 800000 60C, Sep. 19, 2014, pp. 5-1 to 5-65.

(Continued)

*Primary Examiner* — Bickey Dhakal
(74) *Attorney, Agent, or Firm* — Boyle Fredrickson, SC

(57) ABSTRACT

An improved system for tuning a motor controller is disclosed. The controller gains are initially set based on the measured frequency response for the controlled system. A desired level of performance is defined by setting a desired phase margin and a desired gain margin to be observed in the frequency response. An improved method of determining the frequency response provides for a reduced computational intensity. The initial tuning routine uses the frequency response to set not only controller gains, but also settings for filters in the control module. Having obtained the desired level of performance from the initial tuning, the motor drive executes an adaptive tuning routine while controlling the motor. The adaptive tuning routine tracks changes in the operating performance and adjusts the filter settings or the controller gains to return operation to within the desired level of performance while the motor continues to operate.

16 Claims, 9 Drawing Sheets

(56) References Cited

U.S. PATENT DOCUMENTS

| | | | | |
|---|---|---|---|---|
| 2007/0268797 A1* | 11/2007 | Abrishamchian | ... | G11B 5/59688 369/44.34 |
| 2009/0009128 A1* | 1/2009 | Okita | ................... | G05B 13/024 318/619 |
| 2010/0142082 A1* | 6/2010 | Sakagami | ............ | G11B 5/5582 360/75 |

OTHER PUBLICATIONS

Mitsubishi, General-Purpose AC Servo, MELSERVO-J4 Servo Amplifier Instruction Manual, Manual No. SH 030105-E, Apr. 2015. pp. 5-1 to 7-31.
Panasonic, Operating Instructions (Overall) AC Servo Motor & Drives, MINAS A5II/A5 Series, Mar. 19, 2014, pp. 4-1 to 5-62.
Rockwell Automation Publication MOTION-AT005A-EN-P, Out-of-Box Tuning, Mar. 2014, pp. 21-28.
Extended European Search Report dated Mar. 9, 2017: Appiicaton No. 16186569.6-(6) pages.

\* cited by examiner

METHOD FOR TUNING A MOTOR DRIVE USING FREQUENCY RESPONSE

BACKGROUND OF THE INVENTION

The subject matter disclosed herein relates generally to tuning a motor drive and, more specifically, to a method for tuning of a high performance motor drive system utilizing frequency response analysis.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus or a desired motor voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

In order to convert the command signal to the desired output voltage, the motor drive includes a control section. The control section may vary in complexity according to the performance requirements of the motor drive. For instance, a motor drive controlling operation of a pump may only need to start and stop the pump responsive to an on/off command. The motor drive may require minimal control such as an acceleration and deceleration time for the pump. In contrast, another motor drive may control a servo motor moving, for example, one axis of a machining center or an industrial robotic arm. The motor drive may need to not only start and stop the motor, but operate at various operating speeds and/or torques or follow a position command. The motor control may include multiple control circuits, such as a position, velocity, torque, or current control circuit, or a combination thereof. Each control circuit may include, for example, a proportional (P), integral (I), or derivative (D) control path with associated controller gains in each path and may further require additional feedback and/or feed forward control gains. In order to achieve the desired operating performance of the motor, it is necessary to properly select the control paths and the control gains associated with each path.

However, selecting the control gains to achieve a desired level of performance has certain challenges. Although the control paths may be either in parallel or in series with each other, there is ultimately a single input and a single output for the control system. Adjusting a control gain along one path impacts the performance of one or more other paths. The interaction of control gains along various paths often requires a time and labor-intensive iterative approach to selecting control gains in order to achieve the desired level of performance. Further, the final control gains selected often result in less than optimum performance in order to avoid approaching operating regions in which one of the control gains may result in instability of the control system.

In order to achieve better performance from a control system, some controllers provide an automatic tuning procedure. However, existing automatic tuning procedures have certain drawbacks as well. The controller typically only knows the characteristics of a portion of the controlled system. For example, the controlled system may include hardware contained within the motor controller, a motor, a physical coupling to a controlled load, and a controlled load. The controller may know the characteristics of the hardware within the motor controller and of the motor, but may be required to make assumptions regarding the rest of the controlled system. For example, the auto tuning procedure may expect "rigid" coupling of the controlled load to the motor or a low inertia ratio. Such characteristics of the controlled system more closely represent an ideal system and reduce the complexity of determining controller gains. If a load has "compliant" coupling to the motor or has a high inertia ratio, various resonant operating points may exist. When a resonant operating point exists, automatic tuning procedures typically either fail to identify controller gains or identify controller gains that result in a slow response from the controlled load in order to avoid exciting the resonant operating point. This poor tuning results in a system being controlled at less than its desired performance level, reducing the overall performance of the system.

Thus, it would be desirable to provide a system to perform automatic tuning of a motor controller that selects controller gains to achieve a desired level of performance.

Even if controller gains are initially selected to achieve a desired level of performance, the dynamics of the controlled system may vary over time. The dynamics of the system may vary due, for example, to wear of mechanical equipment or repair and/or replacement with equipment having different characteristics than the original equipment. Environmental conditions, such as temperature and/or humidity may also lead to variable operation of the controlled system.

Thus, it would also be desirable to provide a system to perform adaptive tuning of a motor controller to periodically refine the selected controller gains during operation of the controlled system to maintain the desired level of performance.

BRIEF DESCRIPTION OF THE INVENTION

The subject matter disclosed herein describes an improved method for tuning a motor controller to select controller gains and filter settings to achieve a desired level of performance. The controller gains are set based on the measured frequency response for the controlled system. A desired level of performance is defined by setting a desired phase margin and a desired gain margin to be observed in the frequency response. An improved method of determining the frequency response provides for a reduced computational intensity, allowing the motor controller to more rapidly determine the frequency response. The tuning routine uses the frequency response to set the controller gains and the filter frequencies in the control module, such as a notch filter or a low pass filter. In addition, an adaptive tuning routine may be used to adjust the controller gains and the filter frequencies to maintain the desired level of performance while the motor controller operates the motor. The method used to determine the frequency response allows the adaptive tuning routine to periodically determine the frequency response while controlling operation of the motor. The adaptive tuning routine tracks changes in the operation of the controlled system, such as a shifting resonant frequency, increased torque ripple, or increased magnitude of a resonant frequency. The adaptive tuning routine may then adjust the filter settings or the controller gains to maintain stable control and/or return operation to within the desired level of performance while the motor continues to operate.

According to one embodiment of the invention, a method for tuning performance of a motor drive during operation of a motor operatively connected to the motor drive is disclosed. The motor controls motion of a mechanical load coupled to the motor. The method measures a response signal corresponding to operation of the motor during operation of the motor and stores values of the response signal in a memory device of the motor drive. A command signal corresponding to a desired operation of the motor during operation of the motor is also measured and stored in the memory device. A first frequency response is generated within the motor drive as a function of the plurality of values of the response signal, and a second frequency response is generated within the motor drive as a function of the plurality of values of the command signal. A resonant frequency is identified in the first frequency response, where the resonant frequency has a magnitude greater than the magnitude of the other frequencies in the first frequency response. A commanded frequency is identified in the second frequency response, where the commanded frequency has a magnitude greater than the magnitude of the other frequencies in the second frequency response. The resonant frequency is compared to the commanded frequency. When the resonant frequency does not match the commanded frequency, the resonant frequency is compared against a first threshold. A notch filter frequency is set equal to the resonant frequency when the resonant frequency is greater than the first threshold.

According to another embodiment of the invention, a method for tuning performance of a motor drive is disclosed. The motor drive controls operation of a motor, and operation of the motor controls motion of a mechanical load coupled to the motor. The method measures a response signal within the motor drive and stores values of the response signal in a memory device of the motor drive. The response signal changes responsive to a predefined command signal. A first frequency response is generated within the motor drive as a function of the values of the response signal. The first frequency response is determined for a predefined array of frequencies, and a resonant frequency is identified from the first frequency response. The identified resonant frequency is compared to a first threshold and a second threshold, where the first threshold is greater than the second threshold. When the identified resonant frequency is greater than the first threshold, a first control parameter is adjusted. When the identified resonant frequency is between the first and the second thresholds, a second control parameter is adjusted. When the identified resonant frequency is less than the second threshold, a third control parameter is adjusted. The first control parameter may be a low pass filter bandwidth, the second control parameter may be a notch filter frequency, and the third control parameter may be a control loop gain.

According to still another embodiment of the invention, a system for determining configuration of a controller in a motor drive is disclosed. The motor drive includes an inverter section configured to convert a DC voltage present on a DC bus of the motor drive to an AC voltage at an output of the motor drive. The system includes at least one current sensor generating a feedback signal corresponding to a current present on one phase of the output of the motor drive. A control module is configured to receive a predefined input signal, receive the feedback signal from the at least one current sensor, and generate a response signal as a function of the predefined input signal and the feedback signal. The control module includes at least one control loop and at least one notch filter, where each control loop includes at least one controller gain and each notch filter includes a notch filter frequency. A memory device is configured to store values of the response signal and values of the predefined input signal. The system also includes a tuning module operable to generate a first frequency response within the motor drive as a function of the values of the response signal and to generate a second frequency response within the motor drive as a function of the values of the predefined input signal. The first frequency response is determined for a predefined array of frequencies, and the second frequency response is determined for the same predefined array of frequencies. A resonant frequency is identified from the first frequency response and compared to the second frequency response. When the identified resonant frequency is not present in the second frequency response, the tuning module is further operable to compare the identified resonant frequency to a first threshold and a second threshold, where the first threshold is greater than the second threshold; adjust a first control parameter when the identified resonant frequency is greater than the first threshold; adjust a second control parameter when the identified resonant frequency is between the first and the second thresholds; and adjust a third control parameter when the identified resonant frequency is less than the second threshold.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
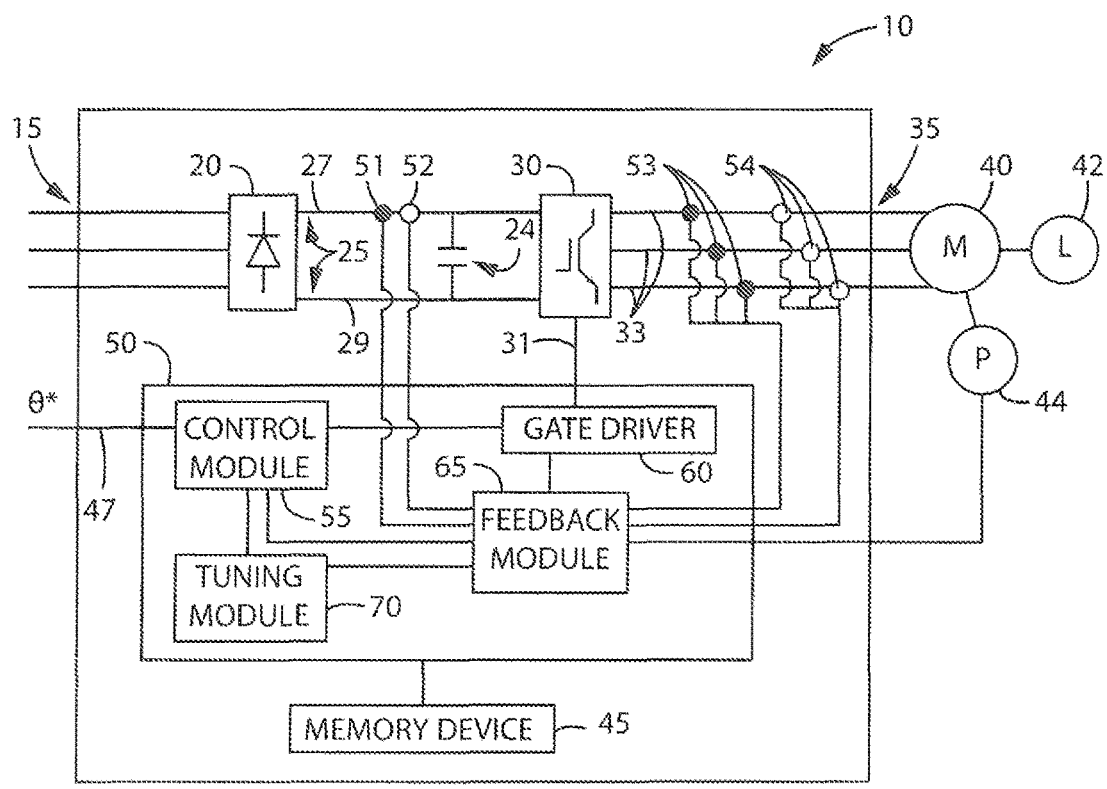
FIG. 1 is a block diagram of a motor drive incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 2:
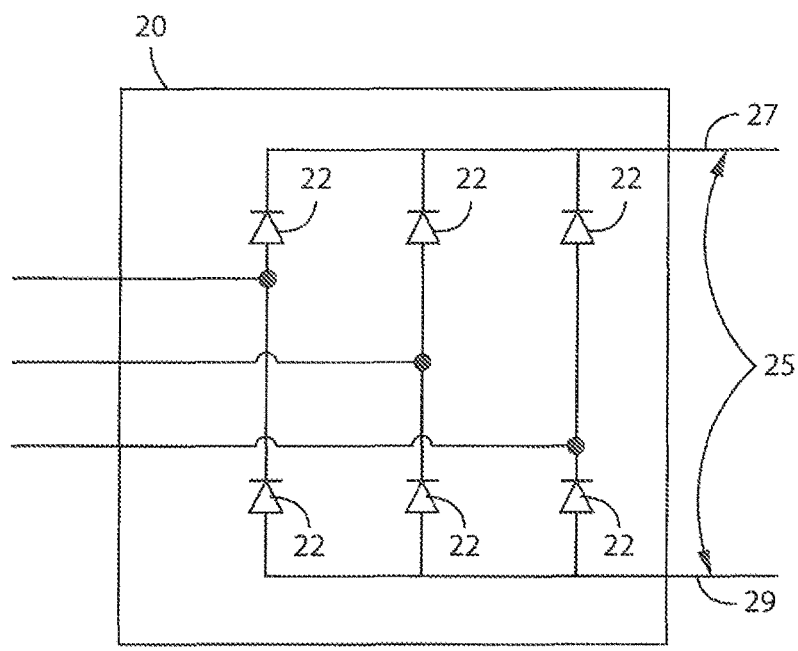
FIG. 2 is a block diagram representation of a rectifier section from the motor drive of FIG. 1.

Turning initially to FIG. 1, a motor drive 10, according to one embodiment of the invention, is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. With reference also to FIG. 2, the illustrated rectifier section 20 includes a set of diodes 22 forming a diode bridge that rectifies the three-phase AC voltage to a DC voltage on the DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 3:
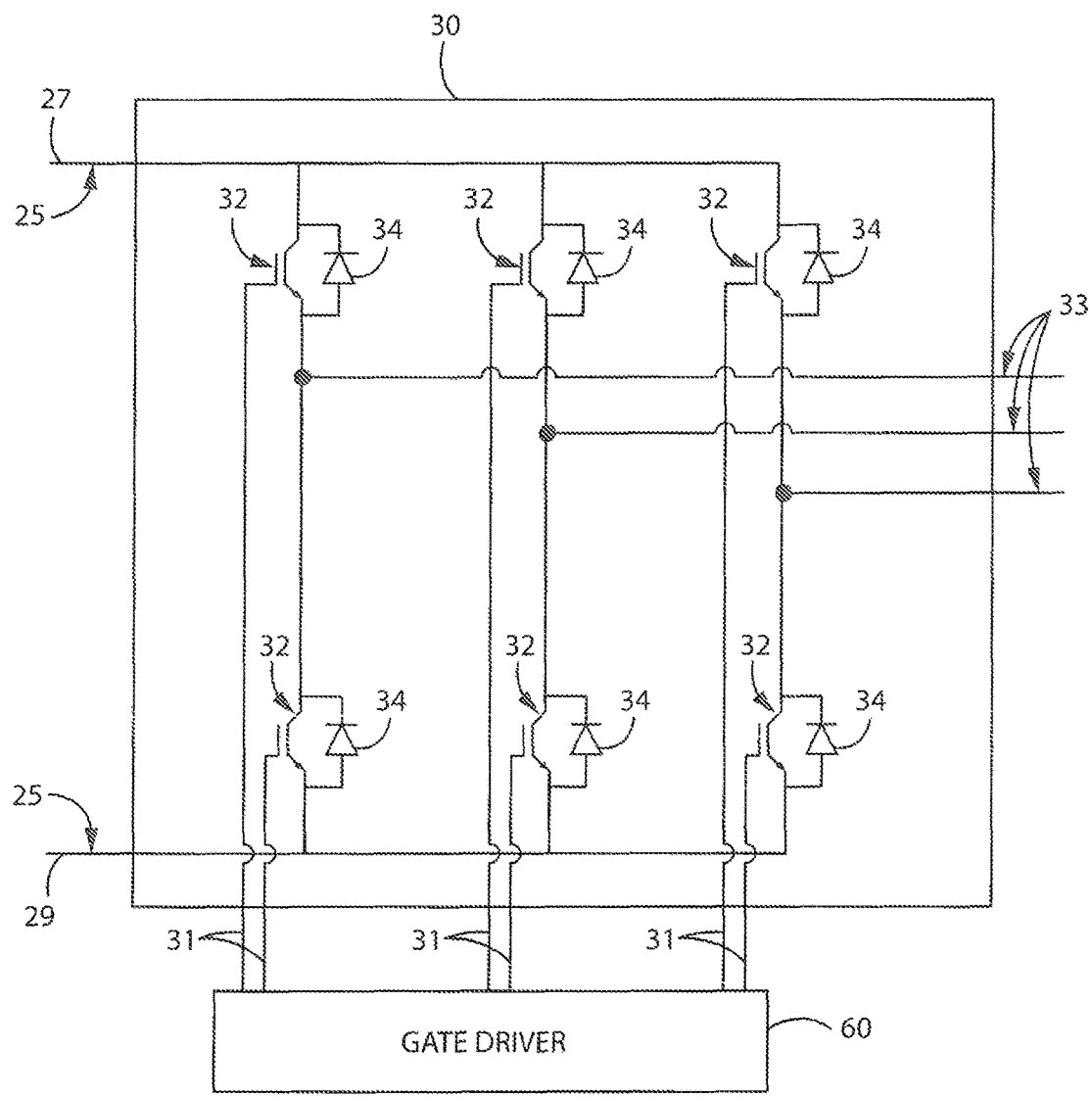
FIG. 3 is a block diagram representation of an inverter section and gate driver module from the motor drive of FIG. 1.

The DC bus 25 is connected in series between the rectifier section 20 and an inverter section 30. Referring also to FIG. 3, the inverter section 30 consists of switching elements, such as transistors, thyristors, or SCRs as is known in the art. The illustrated inverter section 30 includes an insulated gate bipolar transistor (IGBT) 32 and a free wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 1, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

According to one embodiment of the invention, the controller 50 receives a reference signal 47 identifying desired operation of the motor 40 connected to the motor drive 10. The reference signal 47 may be, for example, a position reference ($\theta^*$), a speed reference ($\omega^*$), or a torque reference ($T^*$). For a high performance servo control system, the reference signal 47 is commonly a position reference signal ($\theta^*$).

The controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include a one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive.

The controller 50 utilizes the feedback signals and the reference signal 47 to control operation of the inverter section 30 to generate an output voltage having a desired magnitude and frequency for the motor 40. The feedback signals are processed by the feedback module 65 and converted, as necessary, to signals for the control module 55. The control module 55 also receives the reference signal 47 and executes responsive to the reference signal 47 and the feedback signals to generate a desired output voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40.

Figure 4:
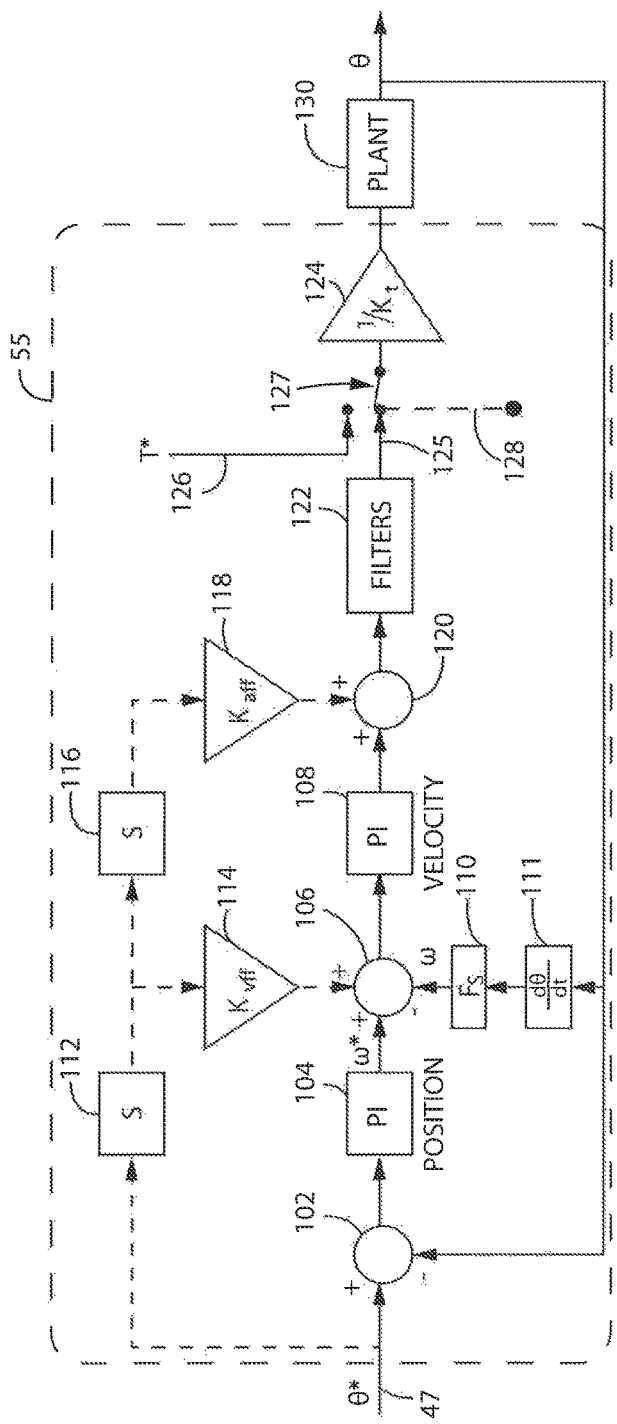
FIG. 4 is a block diagram representation of one embodiment of a control module from the motor drive of FIG. 1.

Referring next to FIG. 4, a control module 55 according to one embodiment of the invention is illustrated. The control module 55 receives a position reference signal ($\theta^*$) as an input. The position reference signal ($\delta^*$) is compared to a position feedback signal ($\theta$) at a first summing junction 102. A position error signal is output from the first summing junction 102 and input to a position loop controller 104. According to the illustrated embodiment, the position loop controller 104 is a proportional-integral (PI) controller. Optionally, the position loop controller 104 may be just a proportional (P) controller or further include a derivative (D) component. Each of the proportional (P), integral (I), and/or derivative (D) components of the position loop controller 104 includes a controller gain. The controller gains are commonly referred to as a proportional gain (Kpp), integral gain (Kpi), and a derivative gain (Kpd). The output of the position loop controller 104 is a velocity reference signal ($\omega^*$). The velocity reference signal ($\theta^*$) is compared to a velocity feedback signal ($\omega$) at a second summing junction 106. The velocity feedback signal ($\omega$) is generated by taking a derivative, as shown in the derivative block 111, of the position feedback signal (0). The velocity feedback signal ($\omega$) may also be filtered by a velocity filter block 110. A velocity error signal is output from the second summing junction 106 and input to a velocity loop controller 108. According to the illustrated embodiment, the velocity loop controller 108 is a proportional-integral (PI) controller. Optionally, the velocity loop controller 108 may be just a proportional (P) controller or further include a derivative (D) component. Each of the proportional (P), integral (I), and/or derivative (D) components of the velocity loop controller 108 includes a controller gain. The controller gains are commonly referred to as a proportional gain (Kvp), integral gain (Kvi), and a derivative gain (Kvd). The output of the velocity loop controller 108 is an acceleration reference signal.

The control module 55 may also include feed forward branches. According to the illustrated embodiment, the control module 55 includes feed forward branches for both the velocity and the acceleration elements. The position reference signal ($\theta^*$) is passed through a first derivative element 112 to obtain a velocity feed forward signal. The velocity feed forward signal is multiplied by a velocity feed forward gain (Kvf) 114 and combined with the velocity reference signal ($\omega^*$) and the velocity feedback signal ($\omega$) at the second summing junction 106. The velocity feed forward signal is passed through a second derivative element 116 to obtain an acceleration feed forward signal. The acceleration feed forward signal is multiplied by an acceleration feed forward gain (Kaf) 118 and combined with the acceleration reference signal at a third summing junction 120.

Figure 5:
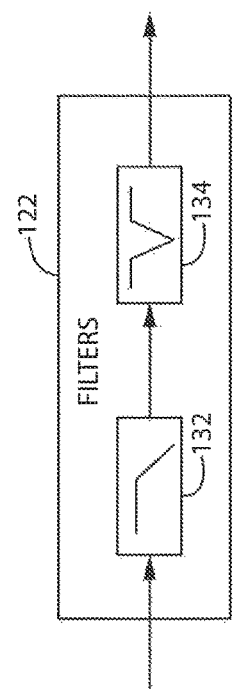
FIG. 5 is a block diagram representation of the filter section from the control module of FIG. 4.

The output of the third summing junction 120 is further processed prior to generating gate signals 31 for the inverter section 30. The output of the third summing junction 120 is provided as an input to a filter section 122. The filter section 122 may include one or more filters to remove unwanted components from the control system. Referring also to FIG. 5, the illustrated filter section 122 includes a low pass filter 132 to attenuate undesirable high frequency components and a notch filter 134 to attenuate specific frequency components having an undesirable effect on the controlled mechanical load 42. It is further contemplated that additional filters may be included in the filter section 122 without deviating from the scope of the invention. In some embodiments of the control module 55, calculations may be performed in a per unit system. Depending on the per unit system, a range of zero to one hundred percent acceleration may be equivalent to a range of zero to one hundred percent torque. As a result, a per unit value of acceleration would be equivalent to a per unit value of torque. In other embodiments, the inertia of the motor or the motor and load may be incorporated into the controller gains of the velocity loop controller 108 and in the acceleration feedforward path to output a torque reference from the third summing junction 120. In still other embodiments, the inertia of the motor may be included in a filter gain to convert the acceleration reference signal output from the third summing junction 120 to a torque reference signal in the filter section 122. It is further contemplated that a separate inertia gain block (not shown) may be inserted between the output of the third summing junction 120 and the switch 127 to convert the acceleration reference signal to a torque reference signal.

According to the illustrated embodiment, the torque reference signal is selected from one of two references. The first torque reference signal 125 is the output from the filter section 122, and the second torque reference signal 126 may be a constant value or follow a predefined profile. The value for the second torque reference signal 126 may be user configurable and may be stored in the memory device 45. A switch 127, controlled by a switch signal 128, may be moved between a first position and a second position to selectively provide either the first torque reference signal 125 or the second torque reference signal 126 to the plant 130. Selection of the torque reference signal will be discussed in more detail below.

The output of the switch 127 is passed through a torque gain block 124. The torque gain block 124 includes an inverse torque constant (1/Kt) which defines a relationship between the desired torque output by the motor and the current required to supply the desired torque. The torque gain block 124 may include one or more additional gain elements combined with the inverse torque constant (1/Kt) to produce a desired current reference to the plant 130 of the controlled system. In a motion control system, the plant 130 typically includes the inverter section 30 of the motor drive 10, the motor 40, a mechanical load 42, and a position feedback device 44. The position feedback device 44 generates the position feedback signal (θ) used by the control module 55.

The current reference signal output from the control module 55 is provided as an input to the plant 130. With reference again to FIG. 1, the output of the control module 55 is provided as an input to the gate driver module 60. The gate driver module 60 converts the current reference to a desired output voltage having a variable amplitude and frequency, where the amplitude and frequency are selected to produce the current reference supplied to the gate driver module 60. Having determined the output voltage required to produce the desired current, the desired output voltage is used to generate the gating signals 31 used by pulse width modulation (PWM) or by other modulation techniques to control the switching elements in the inverter section 30 to produce the desired output voltage. The gating signals 31 subsequently enable/disable the transistors 32 to provide the desired output voltage to the motor 40, which, in turn, results in the desired operation of the mechanical load 42 coupled to the motor 40.

As discussed above, the control module 55 may include a number of controller gains and filter settings which affect performance of the motor drive 10. The controller gains and filter settings need to be adjusted or tuned in order to achieve a desired performance level. Settings for each of the controller gains and filter settings are stored in a non-volatile portion of the memory device 45 to retain the settings when power is removed from the motor drive 10. Typically, the settings are transferred to a volatile portion of the memory device 45 upon applying power to the motor drive 10 to provide for quick reads of the values for use in execution of the control module 55. Default values for each of the controller gains and filter settings may be stored in the memory device 45 from the factory, where the default settings are typically configured to provide a conservative response of the control module 55, such that the a broad range of applications may be started up with little chance of exciting resonances in the mechanical system or having other undesirable and/or unstable operation of the controlled load.

With reference again to FIG. 1, the controller 50 includes a tuning module 70 which is configured to automatically adjust the settings of the controller gains and filter settings in order to achieve a desired performance level for the controlled system. An operator may initiate execution of an initial tuning routine, for example, via a human machine interface (HMI), a user interface on the motor drive, or via any other suitable user interface. Prior to initiation of the tuning routine, the operator may confirm the controlled system is in a suitable operating state (e.g., sufficient range of travel) prior to initiating the routine. The HMI or the user interface may prompt or otherwise provide a method to enter a desired operating performance for the controlled system. It is contemplated that the desired operating performance may be defined, for example, by a phase margin and/or a gain margin for the control loops. A default setting may be stored in the memory device 45 for each of the phase margin and gain margin. The phase margin is preferably at least thirty degrees and, more preferably, at least forty-five degrees. The gain margin is preferably at least 4 dB and, more preferably, at least 8 dB.

Figure 6:
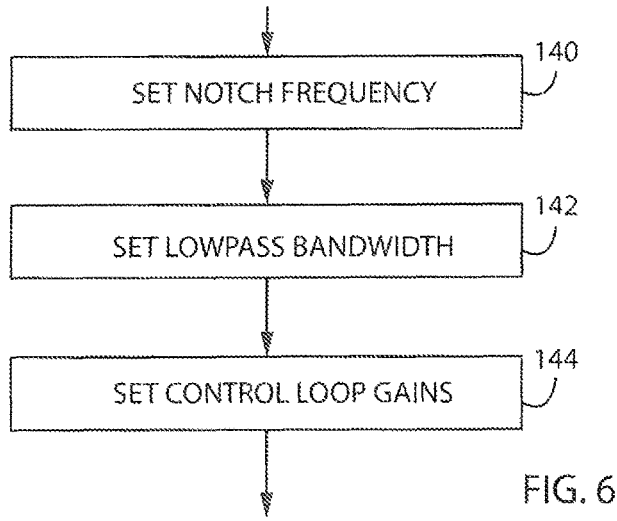
FIG. 6 is a flowchart illustrating one embodiment of the steps to initially tune the motor drive of FIG. 1.

With reference also to FIG. 6, an initial tuning routine is executed by the tuning module 70 and includes three tuning steps to determine settings of the controller gains and filter settings. The first tuning step 140 selects the frequency at which the notch filter 134 operates. The second tuning step 142 selects the bandwidth over which the low pass filter 132 operates, and the third tuning step 144 sets the control loop gains for the control module 55. It is contemplated that the three steps may be performed in various orders and, as discussed in more detail below, may be performed on an iterative basis as subsequent adjustment of one of the control gains and/or filter settings may affect the desired performance achieved at an earlier tuning step.

Figure 8:
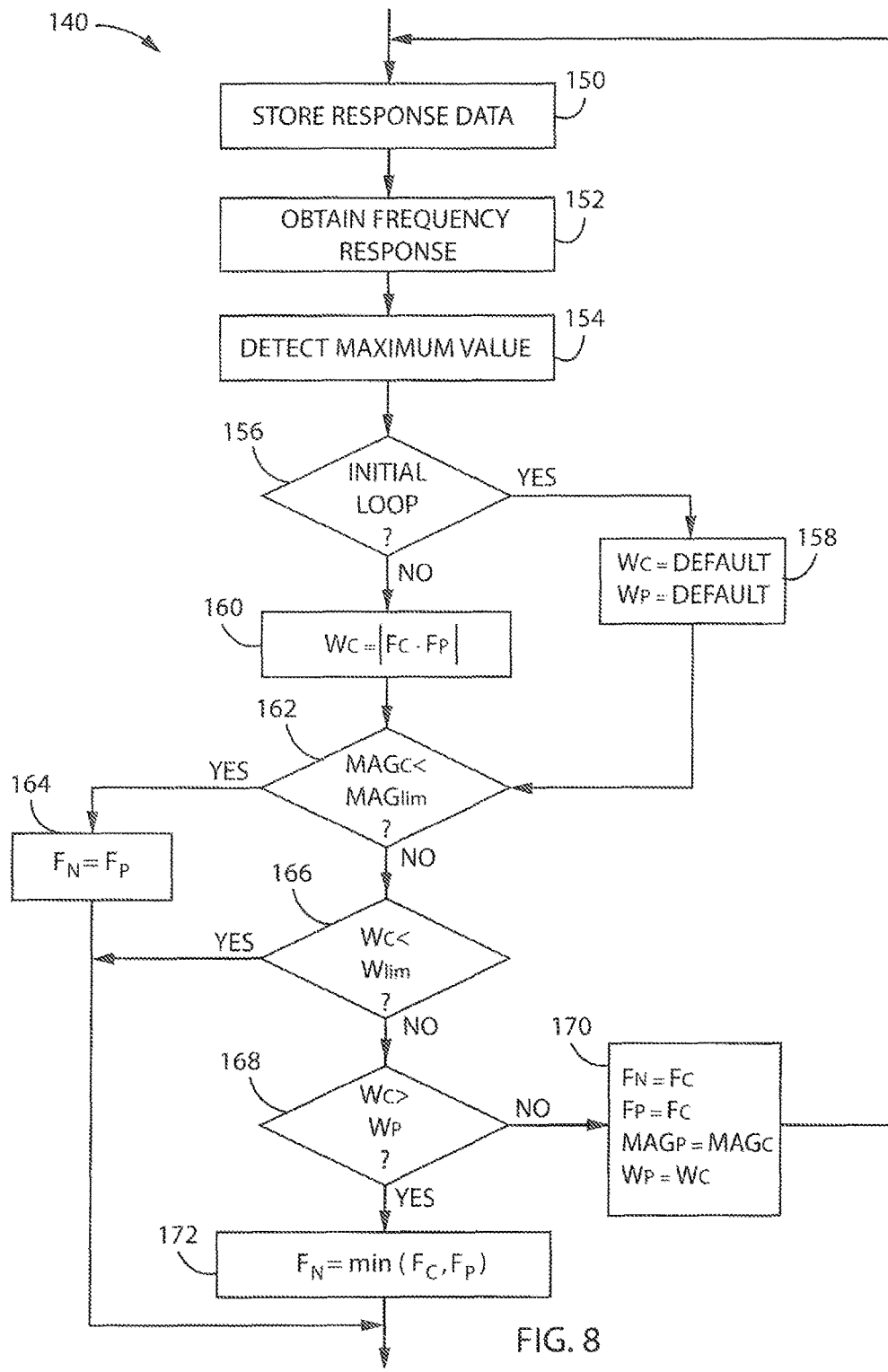
FIG. 8 is a flowchart illustrating one embodiment of the steps to set the notch frequency as shown in FIG. 6

With reference next to FIG. 8, the illustrated embodiment of the invention begins the tuning routine by execution of the first tuning step 140 to determine the frequency, $F_N$, at which the notch filter operates. During the tuning routine, a known reference signal is applied to the system. The known reference signal may be, for example, a position reference signal (θ*) varying at a known rate, a velocity reference signal (ω*), or a torque reference signal (T*). According to the illustrated embodiment, the controller 50 generates the switch signal 128 such that the switch 127 connects the second torque reference signal 126 to the output of the control module 55. The second torque reference signal 126 is a known reference signal generated as a function of parameter settings corresponding to the motor 40 and controlled load 42 or, optionally, the value of the second torque reference signal 126 may be a parameter setting stored in the memory device 45. Data corresponding to a response by the system is stored in the memory device 45 as shown in step 150. The data preferably corresponds to either an internally computed signal or a measured feedback signal related to the torque and/or current output to the motor 40 when the known reference signal is applied. According to one embodiment of the invention, a feedback signal from one of the current sensors 54 at the output from the inverter section 30 is used for the response data. A series of values of the current feedback signal while the motor 40 is operating are sampled and stored in the memory device. Upon taking the desired number of samples, the known reference signal may be removed and further processing may occur without the motor 40 running. A controller gain and/or filter setting may be adjusted and the first known reference signal or a second known reference signal may be reapplied to determine the effect of the adjusted controller gain and/or filter setting. Optionally, the motor 40 may continue to operate during the calculation and subsequent adjustments of controller gain and/or filter settings may occur.

At step 152, a frequency response of the stored data is obtained. The frequency response is a measurement of a signal providing a magnitude and phase of the signal as a function of frequency. In order to determine the frequency response of a signal, a continuous function defining the signal may be determined and a Fourier transform of the continuous function is performed. The Fourier transform expresses the function as a function of frequencies over an infinite frequency interval. However, determining the Fourier transform of a continuous function is computationally intensive. In order to reduce the computation requirements for the frequency analysis of the signal to a suitable level for real-time control, the signal is sampled over a defined sample interval at a sampling frequency and the sampled data is stored in memory. This sampled data may be, for example, the data stored at step 150.

Traditionally, a Discrete Fourier Transform (DFT) is performed on the sampled data to express the stored signal as a discrete set of complex vectors having magnitude and phase information of the signal over a finite frequency interval. A common DFT algorithm is given in Equation 1 below.

$$X(k) = \sum_{n=1}^{N} x(n) e^{-j2\pi(k-1)(n-1)/N} \quad (1)$$

where:
X(k)=vector having a magnitude and phase information for "K" evenly spaced frequency bins
N=maximum number of samples
n=sample number
x(n)=array of sampled data
k=an integral index value selected from the range of 1 to K
K=number of evenly spaced frequency bins between zero hertz and the sampling frequency and typically equal to one half of the maximum number of samples However, the DFT algorithm of Equation 1 has certain drawbacks. The spacing of the frequency bins in the X(k) vector are a function of the sampling frequency and of the number of samples of data that are stored. If a particular frequency component present in a signal does not correspond to one of the evenly spaced frequency bins, then portions of that frequency component are observed in frequency bins other than the frequency of the frequency component. For example, the largest magnitude information may be observed in the frequency bin closest to the actual frequency of the frequency component; however, adjacent frequency bins will also include a frequency component, albeit at a reduced frequency. Subsequent frequency bins extending away from the bin closest to the frequency bin will also include magnitude information of the actual frequency component at sequentially reduced magnitudes. In contrast, if the actual frequency component to be measured aligns with one of the frequency bins, the entire magnitude information for that frequency component will reside in a single frequency bin and the contribution to the magnitude information for the remaining bins from the measured frequency component will be zero. In order to improve the accuracy of the DFT, the number of samples stored must be increased and/or the sampling frequency needs to be increased. However, both options result in increased computational and storage requirements.

Thus, an improved method of determining the magnitude and phase information of the stored signal may be implemented. With reference to Equation 2, the (k−1)/N term in the exponent of Equation 1 may be replaced by fT and the DFT may be evaluated for specific frequencies, f.

$$X(f) = \sum_{n=1}^{N} x_{nom}(n) e^{-j2\pi fT(n-1)} \quad (2)$$

where:
X(f)=vector having a magnitude and phase information for the specified frequency, f
N=maximum number of samples
n=sample number
$x_{norm}(n)$=nominal value determined from the array of sampled data
T=sampling period It is further contemplated that Equation 2 may be evaluated over an array of frequencies. The frequency array may be defined to determine magnitude and frequency information at a desired set of frequencies rather than at the resultant evenly spaced bins of Equation 1. The desired set of frequencies may be, for example, a set of non-uniformly spaced frequencies, a set of band-limited frequencies, or a logarithmic scale of frequencies. It is contemplated that the set of frequencies may be defined by a user and stored in the memory device 45. Optionally, the set of frequencies may be determined by operating characteristics of the controlled system. The frequency response, therefore, as determined in step 152, preferably utilizes an array of frequencies for which knowledge of the magnitude and phase information is desired and Equation 2 to determine the frequency response of the stored signal. At step 154, analysis of the frequency response is performed to identify the frequency component or components having the greatest magnitude information, or the maximum value. In an unstable system, this maximum value typically corresponds to a resonant, or anti-resonant, frequency, and it would be desirable to filter out the component from the stored data.

The remaining steps in FIG. 8, therefore, set the notch filter frequency, $F_N$, to filter out the component of the response resulting from the resonances. At step 156, the tuning module 70 determines whether this is the initial pass through the notch frequency selection procedure 140. If so, the current frequency window, $W_c$, and the past frequency window, $W_p$, are set to default values, as shown in step 158. If not, the current frequency window, $W_c$, is set to an absolute value of the difference between the current frequency, $F_c$, having the greatest magnitude information as determined in step 154, and the past frequency, $F_p$, which had the greatest magnitude information in the prior pass through the notch frequency selection procedure 140. At step 162, the tuning module 70 determines whether the current magnitude value, $MAG_c$, corresponding to the value of the greatest magnitude information identified in step 154, is less than a predefined maximum magnitude value, $MAG_{lim}$. If the current magnitude value, $MAG_c$, is less than the predefined maximum magnitude value, $MAG_{lim}$, the frequency response of the controlled system is within desired limits and the notch filter frequency, $F_N$, does not need to be modified. Consequently, the tuning module 70 leaves the notch filter frequency, $F_N$, at the past frequency, $F_p$, as shown in step 164. If the current magnitude value, $MAG_c$, is greater than the predefined maximum magnitude value, $MAG_{lim}$, the tuning module 70 moves to step 166 to determine whether the current frequency window, $W_c$, is less than the a predefined maximum for the value of the frequency window, $W_{lim}$. Checking for a maximum difference between frequency values helps force convergence to identify a resonant frequency. If the current frequency window, $W_c$, is less than the maximum value of the frequency window, $W_{lim}$, this provides an indication that the tuning module 70 has converged to the desired notch frequency, $F_N$, to attenuate the instabilities in the controlled system. If, however, the current frequency window, $W_c$, is greater than the maximum value of the frequency window, $W_{lim}$, this provides an indication that the tuning module 70 is still converging to the desired notch frequency, $F_N$, and the notch frequency selection procedure 140 moves to step 168 to determine whether the current frequency window, $W_c$, is greater than the previous frequency window, $W_p$. If the current frequency window, $W_c$, is less than the previous value of the frequency window, $W_p$, the notch frequency, $F_N$, is set to the current frequency, $F_c$, the current values of variables are moved into the past values of the variables, as shown in step 170, and the tuning module 70 returns to the top of the notch frequency selection procedure 140 for another pass. If, however, the current frequency window, $W_c$, is greater than the previous value of the frequency window, $W_p$, this indicates that there may be more than one resonant frequency in the system. If the control module 55 includes multiple notch filters, the notch frequency, $F_N$, of the first notch filter may remain the previous value of the frequency, $F_p$, and the tuning module 70 may be executed based on the current frequency, Fc, to determine the notch frequency, $F_N$, of the second notch filter. Thus, the notch frequency selection procedure 140 iteratively updates the notch frequency, $F_N$, until the detected resonant frequency is either attenuated below a maximum value (e.g., step 162) or no longer significantly deviates from the previously measured value. The notch frequency, $F_N$, is then set to the lesser frequency value selected from the current frequency, $F_c$, and the past frequency, $F_p$, as shown in step 172. After setting the notch frequency value, $F_N$, at step 164, 170 or 172, the tuning routine proceeds to step 142 to set the lowpass filter bandwidth, as shown in FIG. 6.

Figure 7:
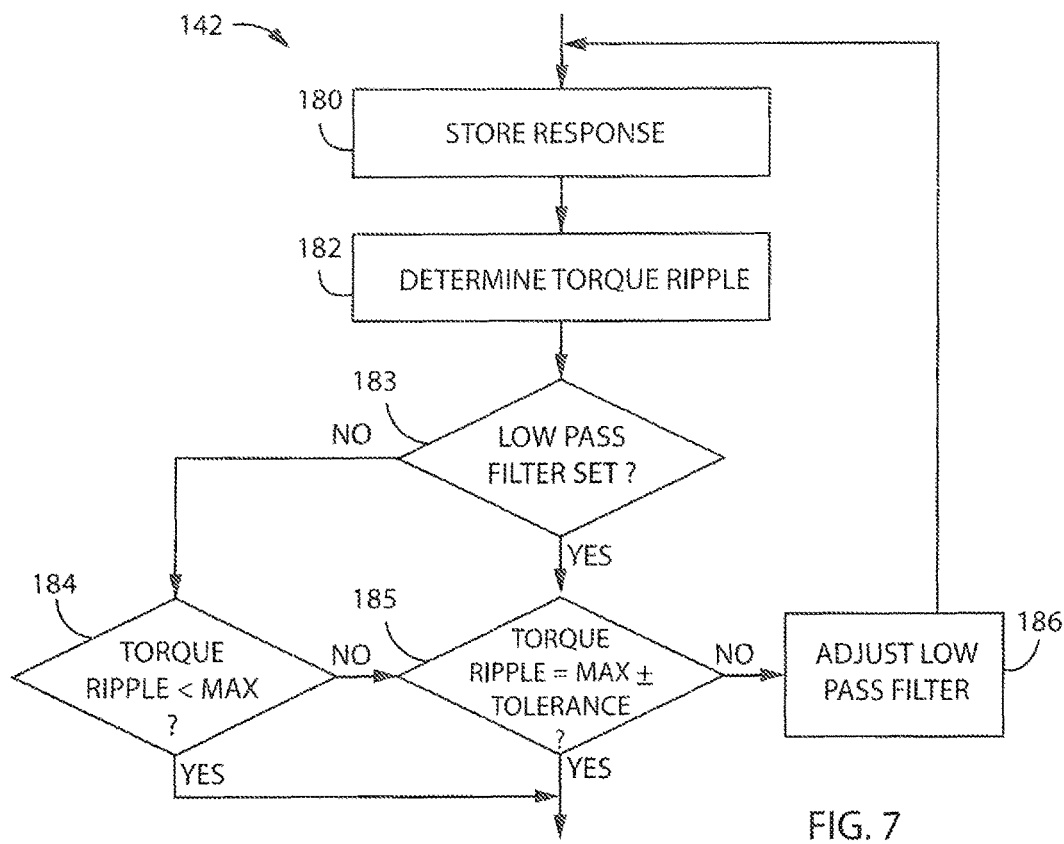
FIG. 7 is a flowchart illustrating one embodiment of the steps to set the low pass bandwidth as shown in FIG. 6.

Referring next to FIG. 7, a known reference signal is again applied to the system. The known reference signal may be the same signal applied for determining the notch frequency, $N_F$, or may be a different reference signal. As previously indicated, the known reference signal may be, for example, a position reference signal (θ*) varying at a known rate, a velocity reference signal (ω*), or a torque reference signal (T*). The known reference signal is applied to the control module 55 and the torque signal is monitored. The torque signal may be, for example, the signal either input to or output from the torque gain block 124. According to the illustrated embodiment, the second torque reference signal 126 may again be applied to the plant and feedback from the current sensors 54 is stored, as shown in step 180, as a signal corresponding to the torque in the motor 40. Optionally, high and low peak values are stored, and at step 182, a magnitude of ripple present on the torque signal is determined.

The lowpass filter bandwidth tuning step 142 next checks whether the low pass filter has been previously set, as shown in step 183. If the low pass filter has not yet been set, the lowpass filter bandwidth tuning step 142 proceeds to check whether the magnitude of torque ripple is greater than a maximum allowable torque ripple, as illustrated in step 184. It is contemplated that the maximum allowable torque ripple is a parameter setting stored in the memory device 45 and configurable by an operator to achieve a desired operation of the controlled load 42. If the torque ripple is less than the maximum allowable torque ripple, then the low pass filter is not required to filter undesired harmonic content and the lowpass filter bandwidth tuning step 142 is complete. If, however, the torque ripple is greater than the maximum allowable torque ripple, then the low pass filter is needed to help filter undesired harmonic content and the lowpass filter bandwidth tuning step 142 moves to step 185. If at step 183, the low pass filter had been set previously, the lowpass filter bandwidth tuning step 142 proceeds to check whether the magnitude of torque ripple is within an acceptable tolerance band of the maximum allowable torque ripple, as shown at step 185. If the torque ripple is within the tolerance band, the present value of the bandwidth for the low pass filter is deemed to be acceptable and no further adjustments are made. If the torque ripple is outside of the tolerance band for the maximum allowable torque ripple, the tuning routine adjusts the bandwidth of the low pass filter, as shown in step 186 and returns to the top of the low pass filter tuning step 142. The sequence of steps is iteratively repeated until the low pass filter attenuates the torque ripple below the desired maximum allowable torque ripple.

Figure 9:
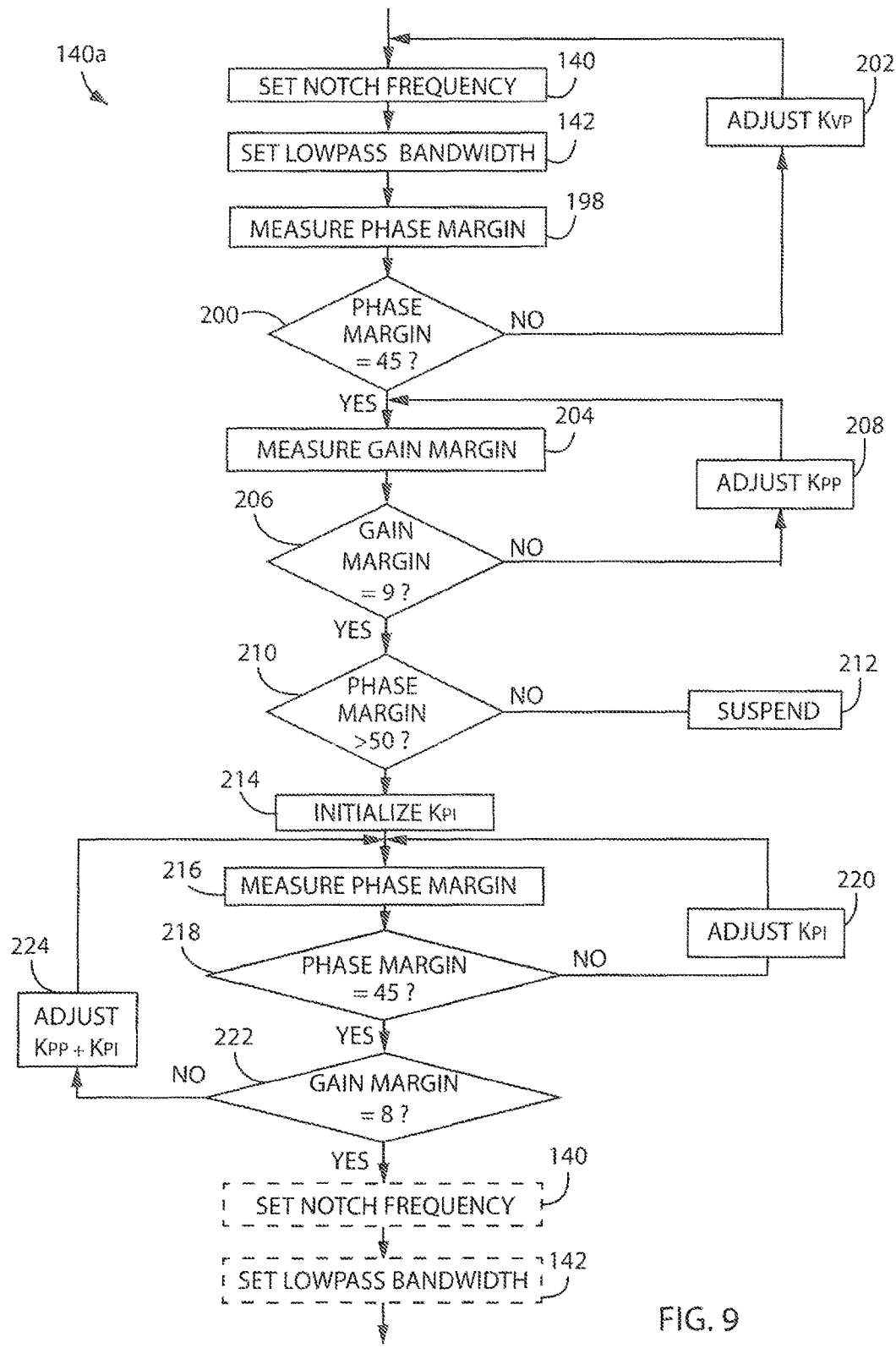
FIG. 9 is a flowchart illustrating one embodiment of the steps to set the control loop gains as shown in FIG. 6 when the motor drive is configured to operate in a position mode.
Figure 10:
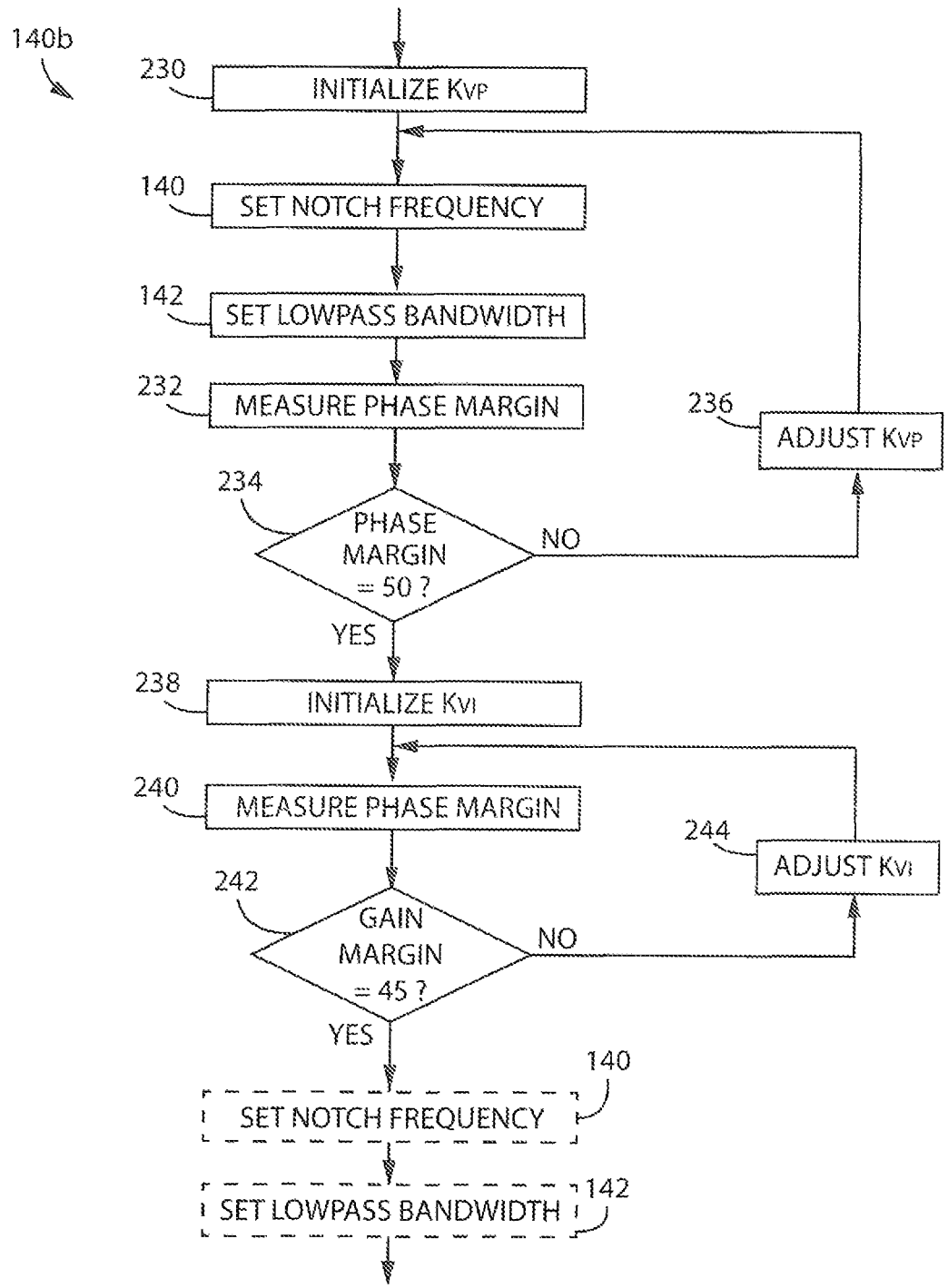
FIG. 10 is a flowchart illustrating one embodiment of the steps to set the control loop gains as shown in FIG. 6 when the motor drive is configured to operate in a velocity mode.

After setting the notch frequency and the low pass filter bandwidth, the third tuning step 144 sets the control loop gains for the control module 55. With reference to FIGS. 9 and 10, the control loop gains are tuned to achieve a desired performance according to one of the two illustrated methods depending on whether the controller 50 is configured to operate in a velocity mode or in a position mode. In FIG. 9, the controller 50 is configured to execute in a position mode, meaning the reference signal 47 to the controller 50 is a position reference signal (θ*). Consequently, controller gains for both the position loop controller 104 and the velocity loop controller 108 need to be determined. The position loop tuning, according to the embodiment illustrated in FIG. 9, begins with setting the notch frequency 140 and setting the low pass filter bandwidth 142. If this is the initial pass through the position tuning loop, the notch frequency and low pass filter bandwidth were just determined, as shown in FIG. 6, and these two steps may be bypassed.

The control loop gains are set according to a desired phase margin and desired gain margin. The desired phase margin and gain margin are stored as settings in the memory device 45. According to one embodiment of the invention, the desired phase margin is at least forty-five degrees and the desired gain margin is at least 8 dB. Optionally, the desired phase and gain margins may be configurable and stored as parameters in the memory device 45. In order to measure the phase margin and gain margin, the controller 50 obtains a Bode plot of the system. The Bode plot measures the response of a system to an input signal. The signal input to and the signal output from the system are both measured. The frequency response of both the input signal and the output signal are obtained using, for example, the methods described above. The Bode plot provides a magnitude and phase of a transfer function describing the system between the input signal and the output signal. The magnitude of the transfer function may be determined by dividing the magnitude of the frequency response for the output signal by the magnitude of the frequency response for the input signal at each frequency. The phase of the transfer function may be determined by subtracting the phase of the input signal from the phase of the output signal at each frequency. The phase margin is then determined as one hundred eighty plus the phase on the Bode plot at which the magnitude of the Bode plot crosses zero decibels. The gain margin is then determined as the magnitude on the Bode plot at which the frequency crosses negative one hundred eighty degrees.

The position tuning loop continues at step 198 by measuring the phase margin from a first open loop Bode plot including the velocity loop controller 108, filters 122, and plant 130. At step 200, the position tuning loop determines whether the phase margin is equal to forty-five degrees. If the phase margin is not forty-five degrees, the controller 50 adjusts the velocity loop proportional gain (Kvp), as shown at step 202. Because adjustment of the velocity loop proportional gain (Kvp) impacts the overall system dynamics, the position tuning loop again sets the notch frequency 140 and the low pass filter bandwidth 142. The series of steps of measuring the phase margin, adjusting the velocity loop proportional gain, and adjusting the filter settings are iteratively repeated until the phase margin is to the recommended value of forty-five degrees or to a user defined phase margin.

When the phase margin from the first Bode plot is forty-five degrees, the position tuning loop measures the gain margin, as shown in step 204, from a second open loop Bode plot including the position loop controller 104, velocity loop controller 108, filters 122, and plant 130. At step 206, the position tuning loop determines whether the gain margin is equal to nine decibels. If the gain margin is not nine decibels, the controller 50 adjusts the position loop proportional gain (Kpp), as shown in step 208. The position loop tuning iteratively obtains the second open loop Bode plot to measure the gain margin and adjusts the position loop proportional gain (Kpp) until the gain margin is nine decibels. When the gain margin from the second Bode plot is nine decibels, the position loop tuning determines whether the phase margin of the second Bode plot is greater than fifty degrees, as shown in step 210. If the phase margin is not at least fifty degrees, the position loop tuning is suspended, as shown in step 212, as the prior tuning should have resulted in a phase margin of at least fifty degrees. If the phase margin is at least fifty degrees, the position loop tuning initializes the position loop integral gain (Kpi). The position tuning loop again measures the phase margin of the second open loop Bode plot as shown in step 216. At step 218, the position tuning loop determines whether the phase margin is set to forty-five degrees. If the phase margin is not forty-five degrees, the controller 50 adjusts the position loop integral gain (Kpi), as shown in step 220. The position loop tuning iteratively obtains the second open loop Bode plot to measure the phase margin and adjusts the position loop integral gain (Kpi) until the phase margin is forty-five degrees.

After obtaining a phase margin of forty-five degrees, the position loop tuning verifies that other performance criteria are still satisfied. At step 222, the position loop tuning determines whether the gain margin is eight decibels. If the gain margin is not eight decibels, then the position loop tuning makes fine adjustments to both the position loop proportional gain (Kpp) and the position loop integral gain (Kpi) to achieve the final desired performance of a phase margin of forty-five degrees and a gain margin of eight decibels. The position loop tuning iteratively obtains the second open loop Bode plot and determines the phase and gain margins until the desired performance is achieved. The final execution of steps 140 and 142 are illustrated as optional. However, because the controller gains impact overall system performance, it may be desirable to have the position loop tuning again set the notch frequency 140 and the low pass filter bandwidth 142.

In FIG. 10, the controller 50 is configured to execute in a velocity mode, meaning the reference signal 47 to the controller 50 is a velocity reference signal (ω*). When the controller 50 is configured to execute in the velocity mode, the velocity reference signal (ω*) may be provided directly to the second summing junction 106, bypassing the position loop controller 104. Consequently, controller gains for only the velocity loop controller 108 need to be determined. When operating in velocity mode, the controller 50 utilizes only the phase margin to determine the control loop gains.

To begin the velocity loop tuning, the velocity loop proportional gain (Kvp) is initialized, as shown in step 230. The low pass filter bandwidth is set as shown by step 142. The velocity tuning loop then measures the phase margin from an open loop Bode plot including the velocity loop controller 108, filters 122, and plant 130. At step 234, the velocity tuning loop determines whether the phase margin is equal to fifty degrees. If the phase margin is not fifty degrees, the controller 50 adjusts the velocity loop proportional gain (Kvp), as shown at step 236. The series of steps of adjusting the velocity loop proportional gain (Kvp), setting the notch frequency, $F_N$, and the low pass filter bandwidth, and measuring the phase margin are iteratively repeated until the phase margin is fifty degrees.

After initially setting the phase margin to fifty degrees, the velocity tuning begins to tune the velocity loop integral gain (Kvi). At step 238, the velocity tuning initializes the velocity loop integral gain (Kvi). The open loop Bode plot is obtained in order to measure the phase margin, as shown in step 240, with both the proportional and integral gains included in the velocity loop. At step 242, the velocity tuning loop determines whether the phase margin is set to forty-five degrees. If the phase margin is not forty-five degrees, the controller 50 adjusts the velocity loop integral gain (Kvi), as shown in step 244. The velocity loop tuning iteratively obtains the open loop Bode plot to measure the phase margin and adjusts the velocity loop integral gain (Kvi) until the phase margin is forty-five degrees.

After obtaining a phase margin of forty-five degrees, the position loop tuning may verify that other performance criteria are still satisfied. The final execution of steps 140 and 142 are illustrated as optional. However, because the controller gains impact overall system performance, it may be desirable to have the position loop tuning again set the notch frequency 140 and the low pass filter bandwidth 142.

Although the tuning routine determines filter settings and controller gains for the control module 55 that provide a desired performance, it may be necessary to adjust these settings during operation to maintain the desired performance. Variable conditions including, but not limited to, temperature fluctuation, humidity variation, and component wear may cause the dynamics of the controlled system to change. In addition, resonant operating points, not observed during initial tuning of the control module 55, may manifest during operation of the controlled system. The tuning module 70, therefore, may further include an adaptive tuning routine to adjust one or more of the notch filter setting, the low pass filter setting, and the controller gains during operation of the motor 40.

In operation, the adaptive tuning routine monitors the frequency response of one or more signals within the controlled system including, for example, the motion profile, the torque reference, and/or the current feedback from the output of the motor drive 10 while the motor 40 is running. According to one embodiment of the invention, the adaptive tuning routine monitors two signals within the controlled system. A first monitored signal corresponds to a command signal and a second monitored signal corresponds to a response signal. With reference to FIG. 4, the monitored command signal may be the position reference signal (θ*), the velocity feed forward signal, or the acceleration feed forward signal. Preferably, the command signal is selected as the acceleration feed forward signal. The monitored response signal may be taken after the third summing junction 120 and before the output to the plant 130. Preferably, the monitored response signal is after the filters 122 and prior to the torque gain block.

The adaptive tuning routine continually stores values of the monitored signals in the memory device 45 on a periodic basis while the motor drive 10 is operating. Preferably, a buffer is defined in the memory device 45 having a fixed length and data is stored on a first-in-first-out (FIFO) basis in the buffer. The controller 50 obtains the frequency response of the stored data for both the monitored command signal and the monitored response signal while also controlling operation of the motor 40. In order to reduce the computational requirements on the controller 50, preferably a DFT, as described in Equation 2, is evaluated for an array of frequencies to determine the frequency response of the stored signals. The adaptive tuning routine generates a command spectrum and response spectrum, each of which identifies a frequency, or frequencies, having the greatest magnitude information based on the monitored command signal and the monitored response signal, respectively. In the frequency response the frequency, or frequencies, with the greatest magnitude information are those most excited by the control system and the response at those frequencies may need to be reduced. The adaptive tuning routine then evaluates the frequency to determine how best to respond to the identified frequency.

As an initial step, the adaptive tuning routine compares the frequency having the greatest magnitude in the response spectrum to the frequencies present in the command spectrum. If, for example, the controller 50 is being commanded to perform a repeated operation, the identified frequency may be a desired operation and, therefore, tuning the controller 50 to reduce the magnitude of this frequency in the response spectrum would be detuning a desirable response. If, however, the frequency identified in the response spectrum with the greatest magnitude information is not in the command spectrum, the adaptive tuning routine determines whether and how best to mitigate the response at that frequency.

The first step in identifying how to mitigate the response at the identified frequency is to determine within which frequency range the identified frequency falls. An initial division of the frequency produces a low, medium, and high frequency range. According to one embodiment of the invention, the low frequency range is from zero to about three hundred hertz (0-300 Hz), the medium frequency range is from about three hundred to about two thousand hertz (300-2000 Hz), and the high frequency range is greater than about two thousand hertz (>2000 Hz). The adaptive tuning routine then adjusts the various controller gains and/or filter frequencies depending on the frequency range within which the identified frequency falls.

Figure 11:
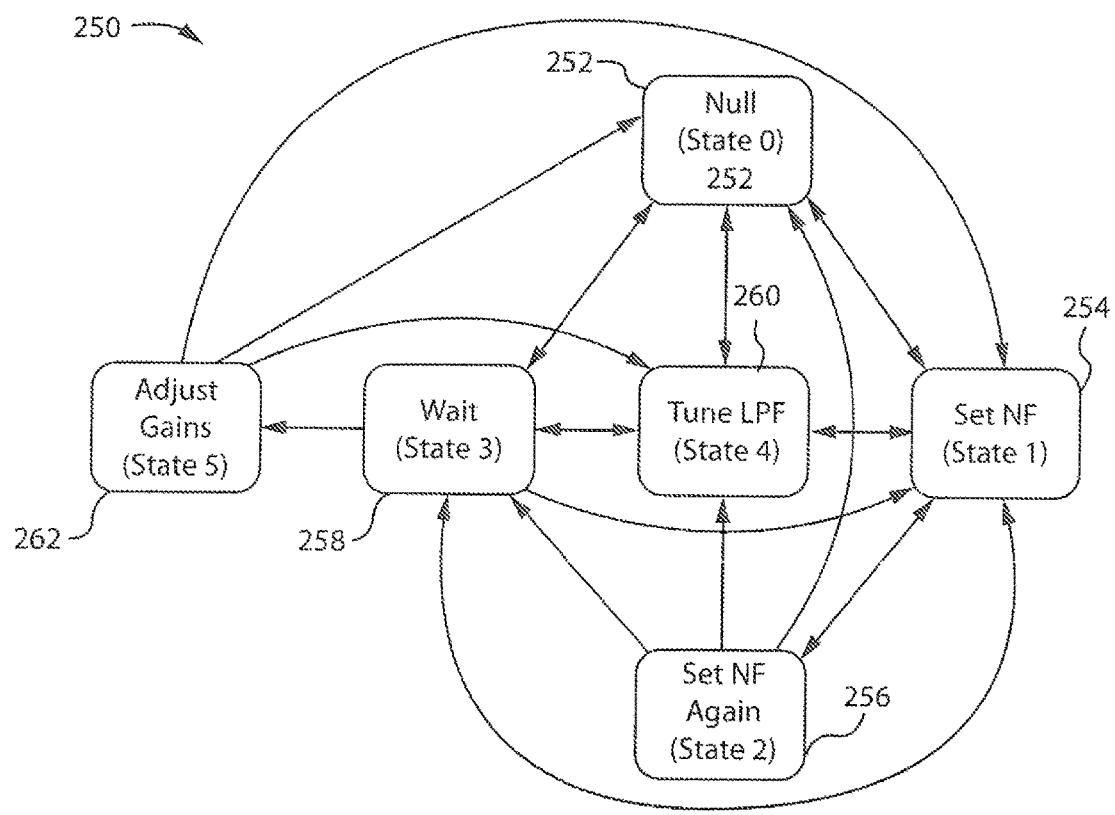
FIG. 11 is a block diagram representation of one embodiment of a state machine for adaptively tuning the motor drive of FIG. 1.

According to the embodiment illustrated in FIG. 11, the adaptive tuning routine is configured as a state machine 250. Each of the states may correspond to one of the desired actions by the adaptive tuning routine. For example, State 1 sets the notch filter frequency, State 4 sets the low pass filter frequency, and State 5 is used to adjust controller gains. Selection of one of the states is dependent on the frequency range within which the identified frequency falls. During a null state 252 (State 0), the motor drive 10 is controlling operation of the motor 40 and no problems have been identified with respect to the filter settings or controller gains. The adaptive tuning routine uses the frequency response of the monitored signals to determine whether a transition to another state is required. If the adaptive tuning routine detects a new resonance having a magnitude exceeding a predefined threshold, the adaptive tuning identifies whether the frequency is in the low, medium, or high frequency range. If the frequency is in the medium frequency range, the identified frequency may best be attenuated by a notch filter. Consequently, the adaptive tuning routine may transition to the set notch filter state 254 (State 1). During the set notch filter state 254, the adaptive tuning routine may execute the set notch frequency step 140 as discussed above. It is contemplated that the adaptive tuning routine may need to remain in the set notch filter state 254 and iteratively execute the set notch frequency step 140 to attenuate the newly detected resonant frequency to an acceptable level.

Changing the notch filter frequency may result in a previously attenuated resonance again becoming present in the control system. The adaptive tuning routine may transition to the set notch frequency again state 256 (State 2). If present in the control module 55, the adaptive tuning routine may identify the second resonant frequency and set a second notch filter frequency to attenuate both resonant frequencies. Optionally, the adaptive tuning routine may determine which of the resonant frequencies has a higher magnitude and set the notch filter frequency to the resonant frequency with higher magnitude and allow the low pass filter to attenuate the second resonant frequency. After setting, or resetting, the notch filter frequency, the adaptive tuning routine determines whether any further resonant frequencies exist. If not, the adaptive tuning routine may return to the null state 252 or move to a wait state 258.

If the adaptive tuning routine either initially or subsequent to setting the notch filter frequency determines that a resonant frequency exists in the high frequency range, the identified frequency may best be attenuated by a low pass filter. Consequently, the adaptive tuning routine may move to the tune low pass filter state 260 (State 4). Identifying a new resonance in the high frequency range may require the low pass filter to attenuate either a previously identified resonance or the newly identified resonance if the control module 55 cannot attenuate multiple resonant frequencies. The low pass filter state 260 executes the set low pass filter bandwidth 142 step as discussed above. It is contemplated that the adaptive tuning routine may need to remain in the low pass filter state 260 and iteratively execute the set low pass filter bandwidth 142 step to verify that the torque ripple is less than a maximum acceptable level. Further, the adaptive tuning routine may iteratively move between the set notch filter state 254 and the tune low pass filter state 260 to achieve a desired level of performance from the filters in the control module 55. As a result of the afore-described adaptive tuning steps, the adaptive tuning routine may effectively track a changing resonant frequency in the controlled system.

If the adaptive tuning routine either initially or subsequent to setting the notch or low pass filter frequencies determines that a resonant frequency exists in the low frequency range, the identified frequency may best be attenuated by adjusting the controller gains. Consequently, the adaptive tuning routine may then transition to the adjust gains state 262 (State 5) to adjust the controller gains. In the adjust gains state 262, the adaptive tuning routine may tune any of the control loops present in the control module 55. According to the embodiment illustrated in FIG. 4, the adaptive tuning routine may execute either the position loop tuning or the velocity loop tuning, as described above and according to the configuration of the motor drive 10. It is further contemplated that adaptive tuning routine may iteratively move between the adjust gains state 262 and the state for adjusting either the notch filter 254 and/or the low pass filter bandwidth 260 until a suitable operating point has been obtained.

The adaptive tuning routine further includes a wait state 258 (State 3). It is contemplated that the wait state 258 maybe entered from any of the other states in the adaptive tuning routine. Upon initial detection of a problem, for example, the adaptive tuning routine may enter the wait state 258 to verify that a problem exists rather than identifying an anomalous and/or spurious operating condition. Similarly, after any of the controller gains and/or filter settings have been adjusted, the respective tuning states may transition to the wait state 258 to verify that desired operation either has been achieved or continues. During the wait state 258, the tuning module 70 may continue monitoring the frequency response of the controlled signal(s). The wait state 258 may transition to any of the controller and/or filter adjustment states to make necessary adjustments to the control system in response to the monitored frequency response of the controlled signals.

Figure 12:
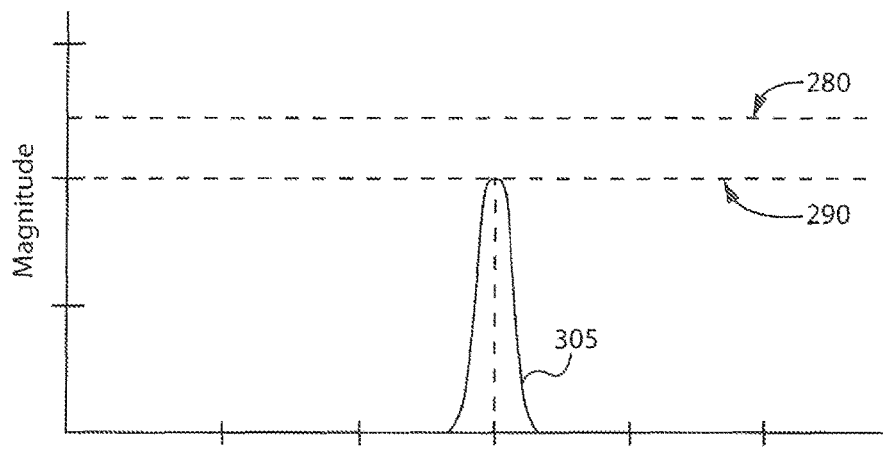
FIG. 12 is a graphical representation of a first exemplary low frequency resonance identified for the motor drive of FIG. 1 during adaptive tuning.
Figure 13:
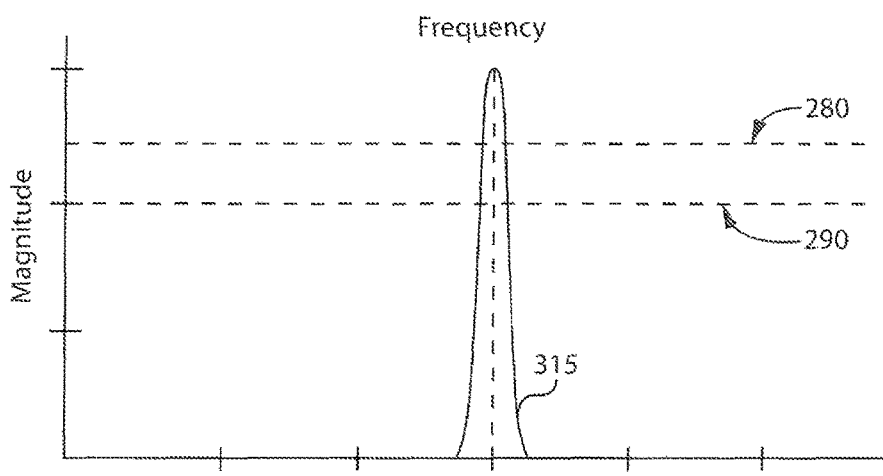
FIG. 13 is a graphical representation of a second exemplary low frequency resonance identified for the motor drive of FIG. 1 during adaptive tuning.
Figure 14:
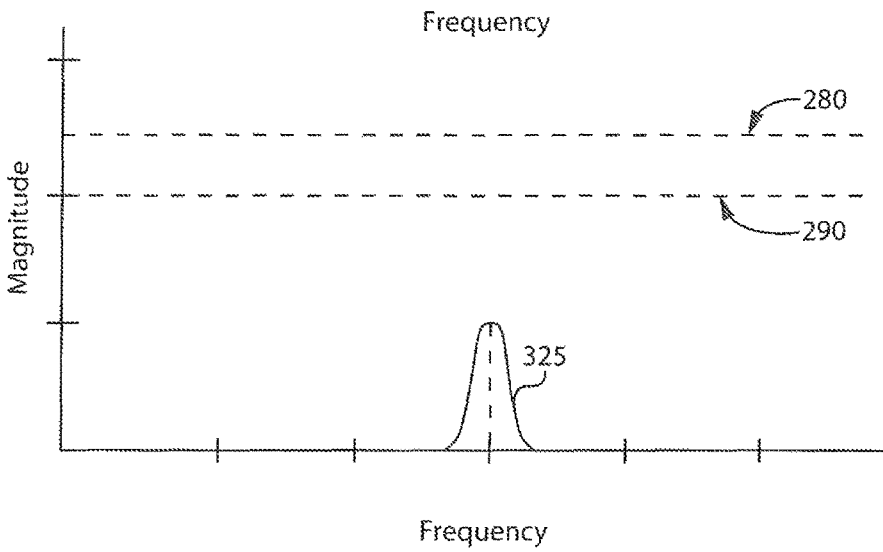
FIG. 14 is a graphical representation of a third exemplary low frequency resonance identified for the motor drive of FIG. 1 during adaptive tuning.

Operation of the adjust gains state 262 (State 5) is dependent on the magnitude of the resonance identified. Referring next to FIGS. 12-14, graphical illustrations of several exemplary low frequency resonances identified by the adaptive tuning routine are illustrated. A hysteresis band is defined by a first threshold 280, which sets a high magnitude threshold, and a second threshold 290, which sets a low magnitude threshold. If the magnitude of a frequency response at a particular frequency falls within the hysteresis band, the adaptive tuning routine takes no action. If the magnitude of the frequency response falls outside of the hysteresis band, the adaptive tuning routine will adjust the controller gains and/or the filter settings to bring the magnitude within the hysteresis band. With reference first to FIG. 12, a first resonance 305 is illustrated. The magnitude of the first resonance 305 is at the low magnitude threshold 290. Therefore, the adaptive tuning routine detects no problem and stays in the null state 252 or wait state 258 as appropriate.

With reference next to FIG. 13, a second resonance 315 is illustrated. The magnitude of the second resonance is greater than the high magnitude threshold 280. This magnitude indicates that an unacceptable level of instability has entered the controlled system. The newly developed instability may be due, for example, from a change in operation, such as an increase in speed or motion profile or from a change in the operating conditions, such as ambient temperature or humidity, or further from wear on a component creating a new resonance. Regardless of the cause of the instability, the adaptive tuning routine may execute the position loop tuning or the velocity loop tuning, as described above, to adjust the controller gains until the magnitude of the second resonance 315 is within the hysteresis band defined by the high magnitude threshold 280 and the low magnitude threshold 290.

With reference now to FIG. 14, a third resonance 325 is illustrated. The magnitude of the third resonance 325 is less than the low magnitude threshold 290. Thus, the control system may be operating at less than optimal performance, which may result in reduced efficiency. The change in performance may again be from a change in operation, such as a decrease in speed or motion profile or from a change in the operating conditions, such as ambient temperature or humidity, or further from wear on a component creating less resistance. Regardless of the cause of the decrease of the magnitude of the third resonance 325, it may be desirable to have the controller generate a more aggressive response without creating instability. The adaptive tuning routine may execute the position loop tuning or the velocity loop tuning, as described above, to adjust the controller gains, resulting in a more responsive set of controller gains. Increasing the controller gains may also require the adaptive tuning routine to again adjust the filter frequencies. The adaptive tuning routine, therefore, may move to the set notch frequency state 254, the tune low pass filter state 260, a combination thereof, or iteratively move between states until the magnitude of the third resonance 325 is within the hysteresis band defined by the high magnitude threshold 280 and the low magnitude threshold 290. Thus, the adaptive tuning routine may be used to either reduce or increase controller gains in order to converge on a desired performance level as a function of the observed frequency response of the monitored signals.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for tuning performance of a motor drive during operation of a motor operatively connected to the motor drive, wherein the motor controls motion of a mechanical load coupled to the motor, the method comprising the steps of:
    measuring a first feedback signal generated by at least one current sensor, wherein the first feedback signal corresponds to a current present on one phase of the output of the motor drive;
    measuring a second feedback signal generated by a position feedback device connected to the motor;
    measuring a command signal provided to a control loop in the motor drive, wherein the command signal corresponds to a desired operation of the motor during operation of the motor;
    storing a plurality of values of the command signal in a memory device of the motor drive;
    generating a response signal with a control module in the motor drive corresponding to operation of the motor during operation of the motor, wherein: the control module includes the control loop and at least one notch filter, each notch filter includes a notch filter frequency, and the response signal is generated as a function of one of the first feedback signal and the second feedback signal;
    storing a plurality of values of the response signal in the memory device of the motor drive;
    generating a first frequency response within the motor drive as a function of the plurality of values of the response signal;
    generating a second frequency response within the motor drive as a function of the plurality of values of the command signal;
    identifying a resonant frequency in the first frequency response having a magnitude greater than the magnitude of the other frequencies in the first frequency response;
    identifying a commanded frequency in the second frequency response having a magnitude greater than the magnitude of the other frequencies in the second frequency response;
    comparing the resonant frequency to the commanded frequency;
    comparing a magnitude of the resonant frequency against a first threshold when the resonant frequency does not match the commanded frequency; and
    setting the notch filter frequency of the notch filter in the control loop equal to the resonant frequency when the magnitude of the resonant frequency is greater than the first threshold to attenuate the magnitude of the identified resonant frequency.

2. The method of claim 1 wherein:
    each of the first and the second frequency responses is determined for a predefined array of frequencies,
    the step of generating the first frequency response further comprises the steps of:
        reading the predefined array of frequencies from the memory device in the motor drive; and
        determining a magnitude and a phase for each frequency in the predefined array of frequencies as a function of the plurality of values of the response signal; and
    the step of generating the second frequency response further comprises the steps of:

reading the predefined array of frequencies from the memory device in the motor drive; and determining a magnitude and a phase for each frequency in the predefined array of frequencies as a function of the plurality of values of the command signal.

3. The method of claim 1 further comprising the steps of:

determining one of a plurality of frequency ranges in which the resonant frequency exists when the resonant frequency does not match the commanded frequency, wherein the notch filter frequency is set equal to the resonant frequency when the resonant frequency is in a first frequency range; and setting a low pass filter frequency of a low pass filter in the control module equal to or less than the resonant frequency to attenuate the magnitude of the resonant frequency when the resonant frequency is in a second frequency range and the second frequency range is greater than the first frequency range.

4. The method of claim 3, further comprising the step of adjusting at least one gain in the at least one control loop for the control module of the motor drive when the resonant frequency is in a third frequency range and the third frequency range is less than the first frequency range.

5. The method of claim 4 wherein the step of adjusting at least one gain further comprises the steps of:

comparing the magnitude of the resonant frequency to an upper limit;

adjusting the at least one gain to reduce the magnitude of the resonant frequency when the magnitude of the resonant frequency is greater than the upper limit;

comparing the magnitude of the resonant frequency to a lower limit; and adjusting the at least one gain to increase the magnitude of the resonant frequency when the magnitude of the resonant frequency is less than the lower limit.

6. A method for tuning performance of a motor drive, wherein the motor drive controls operation of a motor and wherein operation of the motor controls motion of a mechanical load coupled to the motor, the method comprising the steps of:

measuring a first feedback signal generated by at least one current sensor, wherein the first feedback signal corresponds to a current present on one phase of the output of the motor drive;

measuring a second feedback signal generated by a position feedback device connected to the motor;

providing a command signal to a control loop in the motor drive corresponding to a desired operation of the mechanical load;

generating a response signal with a control module in the motor drive, wherein: the control module includes the control loon and at least one notch filter, each notch filter includes a notch filter frequency, and the response signal is generated as a function of one of the first feedback signal and the second feedback signal;

storing a plurality of values of the response signal in a memory device of the motor drive;

generating a first frequency response within the motor drive as a function of the plurality of values of the response signal, wherein the first frequency response is determined for a predefined array of frequencies;

identifying a resonant frequency from the first frequency response;

comparing a magnitude of the resonant frequency to a first threshold;

when the magnitude of the resonant frequency is greater than the predefined threshold, determining one of a plurality of frequency ranges in which the resonant frequency exists;

adjusting a gain for the control loop to reduce the magnitude of the resonant frequency when the identified resonant frequency is in a first frequency range, selected from the plurality of frequency ranges;

adjusting a low pass filter bandwidth of a low pass filter in the control module to reduce the magnitude of the resonant frequency when the identified resonant frequency is in a second frequency range, selected from the plurality of frequency ranges; and adjusting the notch filter frequency of one of the at least one notch filters to reduce the magnitude of the resonant frequency when the identified resonant frequency is in a third frequency range, selected from the plurality of frequency ranges.

7. The method of claim 6 further comprising the steps of:

storing a plurality of values of the command signal in the memory device of the motor drive;

generating a second frequency response within the motor drive as a function of the plurality of values of the command signal, wherein the second frequency response sequence is determined for the predefined array of frequencies;

comparing the identified resonant frequency to the second frequency response; and not performing each of the adjusting steps when the identified resonant frequency corresponds to a frequency in the second frequency response.

8. The method of claim 7 wherein the command signal is selected from one of an input to the control module and a feed forward signal determined from the input to the control module.

9. The method of claim 8 wherein the steps are performed at a periodic interval when the motor drive is controlling operation of the motor.

10. The method of claim 9 wherein the step of adjusting the notch filter frequency further comprises the steps:

comparing the magnitude of the identified resonant frequency to a maximum magnitude;

setting the notch filter frequency to a previous notch filter frequency when the magnitude of the identified resonant frequency is less than the maximum magnitude; and setting the notch filter frequency to the identified resonant frequency when the magnitude of the identified resonant frequency is greater than the maximum magnitude and when the difference between identified resonant frequency and the previous notch filter frequency is greater than a minimum difference.

11. The method of claim 9 wherein the step of adjusting the the low pass filter bandwidth further comprises the steps of:

determining a torque ripple from the response signal; and adjusting the low pass filter bandwidth when the torque ripple is greater than a maximum allowed torque ripple.

12. The method of claim 9 wherein the step of adjusting the the gain for the control loop further comprises the steps of:

determining at least one of a phase margin and a gain margin of the control loop as a function of the first frequency response and the second frequency response; and setting the gain as a function of at least one of the phase margin and the gain margin.

13. A system for determining configuration of a controller in a motor drive, wherein the motor drive includes an inverter section configured to convert a DC voltage present on a DC bus of the motor drive to an AC voltage at an output of the motor drive, the system comprising:
- at least one current sensor generating a first feedback signal corresponding to a current present on one phase of the output of the motor drive;
- an input configured to receive a second feedback signal generated by a position feedback device connected to a motor controlled by the motor drive;
- a control module configured to receive a predefined input signal, receive the first feedback signal, receive the second feedback signal, and generate a response signal as a function of the predefined input signal and one of the first feedback signal and the second feedback signal, the control module including at least one control loop and at least one notch filter, wherein each control loop includes at least one controller gain and each notch filter includes a notch filter frequency;
- a memory device configured to store a plurality of values of the response signal and a plurality of values of the predefined input signal; and
- a tuning module operable to:
    - generate a first frequency response within the motor drive as a function of the plurality of values of the response signal, wherein the first frequency response is determined for a predefined array of frequencies;
    - generate a second frequency response within the motor drive as a function of the plurality of values of the predefined input signal, wherein the second frequency response is determined for the predefined array of frequencies;
    - identify a resonant frequency from the first frequency response;
    - compare a magnitude of the identified resonant frequency to a first threshold;
    - when the magnitude of the identified resonant frequency is greater than the first threshold, adjust a first control parameter to attenuate the magnitude of the identified resonant frequency;
    - identify a magnitude of torque ripple generated by the predefined input signal;
    - when the magnitude of torque ripple is greater than a second threshold, adjust a second control parameter to attenuate the magnitude of torque ripple; and
    - adjust a third control parameter as a function of the first frequency response and of the second frequency response.

14. The system of claim 13 wherein the first control parameter is a notch filter frequency, the second control parameter is a low pass filter frequency, and the third control parameter is a control loop gain.

15. The system of claim 13 wherein the first control parameter is a notch filter frequency and wherein the tuning module is further operable to adjust the first control parameter by:
- comparing the magnitude of the identified resonant frequency to a maximum magnitude;
- setting the notch filter frequency to a previous notch filter frequency when the magnitude of the identified resonant frequency is less than the maximum magnitude; and
- setting the notch filter frequency to the identified resonant frequency when the magnitude of the identified resonant frequency is greater than the maximum magnitude and when the difference between identified resonant frequency and the previous notch filter frequency is greater than a minimum difference.

16. The system of claim 13 wherein the third control parameter is at least one controller gain frequency and wherein the tuning module is further operable to adjust the third control parameter by:
- determining at least one of a phase margin and a gain margin of the controller as a function of the first frequency response and the second frequency response; and
- setting the at least one controller gain as a function of at least one of the phase margin and the gain margin.

* * * * *

UNITED STATES PATENT AND TRADEMARK OFFICE
CERTIFICATE OF CORRECTION

PATENT NO. : 10,033,319 B2
APPLICATION NO. : 14/842495
DATED : July 24, 2018
INVENTOR(S) : Aderiano M. da Silva et al.

Page 1 of 1

It is certified that error appears in the above-identified patent and that said Letters Patent is hereby corrected as shown below:

In the Claims

Claim 6, Column 21, Line 54, replace "loon" with "loop".

Signed and Sealed this
Fourth Day of December, 2018

Andrei Iancu
*Director of the United States Patent and Trademark Office*